United States Patent
Shimamura

(10) Patent No.: US 7,002,581 B2
(45) Date of Patent: Feb. 21, 2006

(54) CHARACTER INFORMATION PROCESSING APPARATUS, CHARACTER INFORMATION PROCESSING METHOD AND STORAGE MEDIUM

(75) Inventor: Kaoru Shimamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 226 days.

(21) Appl. No.: 09/961,180

(22) Filed: Sep. 24, 2001

(65) Prior Publication Data

US 2002/0089503 A1 Jul. 11, 2002

(30) Foreign Application Priority Data

Dec. 19, 2000 (JP) .............................. 2000-386034

(51) Int. Cl.
*G09G 5/24* (2006.01)
(52) U.S. Cl. .................................................. 345/467
(58) Field of Classification Search ................ 345/467; 358/1.11
See application file for complete search history.

(56) References Cited

U.S. PATENT DOCUMENTS

| | | | | |
|---|---|---|---|---|
| 4,594,674 A | * | 6/1986 | Boulia et al. ............... | 345/471 |
| 5,600,770 A | * | 2/1997 | Kawabata et al. .......... | 345/467 |
| 5,990,907 A | * | 11/1999 | Colletti ..................... | 345/467 |
| 6,073,147 A | * | 6/2000 | Chan et al. ................. | 345/467 |
| 6,320,587 B1 | * | 11/2001 | Funyu ........................ | 345/467 |

FOREIGN PATENT DOCUMENTS

JP          11-007442          1/1999

\* cited by examiner

*Primary Examiner*—Jeffery A. Brier
(74) *Attorney, Agent, or Firm*—Staas & Halsey LLP

(57) ABSTRACT

A character information processing apparatus outputs a character pattern corresponding to an input data. The character information processing apparatus includes a logic code acquiring unit which acquires a logic code based on the input data, a code converting unit which converts the logic code acquired by the logic code acquiring unit into a font number and a character code, and an output unit which outputs a character pattern depending on the character code, by use of a font file corresponding to the font number obtained by the code converting unit.

15 Claims, 21 Drawing Sheets

FIG.1

| OUTPUT | 窓は恪の本字 (C1)<br>(C1 IS ORIGINAL CHARACTER OF 恪) |
|---|---|
| | FONT SPECIFYING PROCESS |
| DATA FORMAT | {¥font¥[FONT NAME]{¥text[TEXT]}} |
| EXAMPLE OF FORMAT | {¥font¥明朝体-00-01{¥text 消}}<br>{¥font¥明朝体-00-00{¥textは恪の本字}}<br>(text is original character of 恪) |
| DATA STORAGE METHOD TO DATABASE, ETC. | FONT CAN BE SPECIFIED WITH RESPECT TO CHARACTER CODE IN FORMAT DATA |
| CONVERSION INTO OTHER CODE | NECESSARY TO JUDGE FONT & COMPLICATED COMPARED TO PROCESS WHICH JUDGES SOLELY BY CODE |

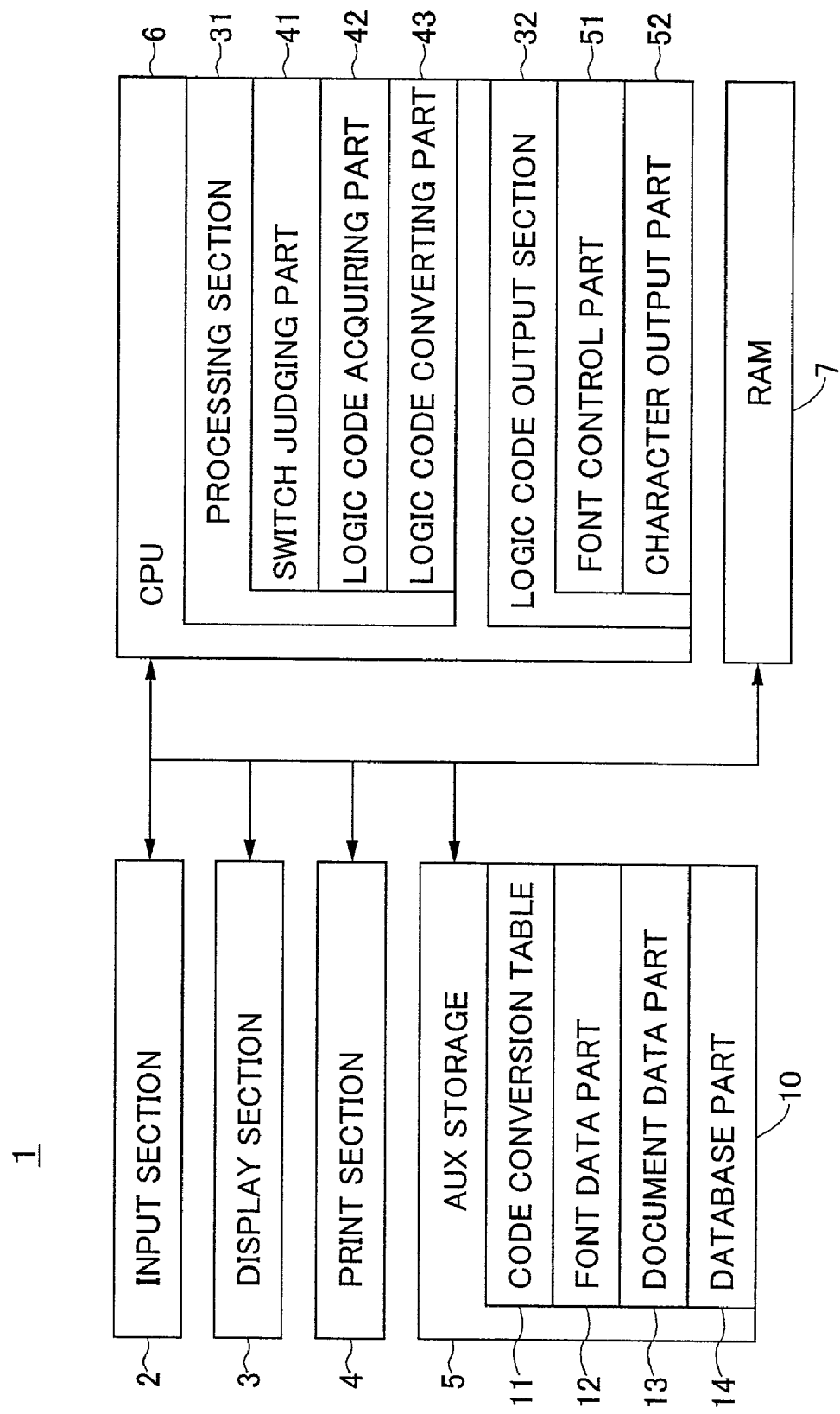

FIG.3

| LOGIC CODE | GROUP NUMBER | PLANE NUMBER | CHARACTER NUMBER |
|---|---|---|---|
| 0x00 00 0000 | 00 | 0X00 | 0x0000 |
| | | | : |
| | | | 0xFFFF |
| | | : | 0x0000 |
| | | | : |
| | | | 0xFFFF |
| | | 0XFF | 0x0000 |
| | | | : |
| | | | 0xFFFF |
| | mm | 0X00 | 0x0000 |
| | | | : |
| | | | 0xFFFF |
| | | : | 0x0000 |
| : | | | : |
| : | | | 0xFFFF |
| : | | 0XFF | 0x0000 |
| | | | : |
| | | | 0xFFFF |
| 0xFF 00 0000 | FF | 0X00 | 0x0000 |
| | | | : |
| | | | 0xFFFF |
| | | : | 0x0000 |
| | | | : |
| | | | 0xFFFF |
| | | 0XFF | 0x0000 |
| | | | : |
| | | | 0xFFFF |

FIG.4

| SWITCHING TYPE | FORMAT | EXAMPLE OF FORMAT | EXAMPLE OF CODE DISPLAYED |
|---|---|---|---|
| GROUP SWITCHING | [GROUP CODE][PLANE CODE][CHARACTER NUMBER] | -0059FB | 0xF41 0x30 0x30 0x35 0x39 0x46 0x42 |
| FACE SWITCHING | [PLANE CODE][CHARACTER NUMBER] | -59FB | 0xF041 0x35 0x39 0x46 0x42 |

| | |
|---|---|
| GROUP SWITCHING TABLE | ~21 |
| FACE SWITCHING TABLE | ~22 |
| FONT NAME CONVERSION TABLE | ~23 |
| FONT CODE CONVERSION TABLE | ~24 |
| LOGIC CODE CONVERSION TABLE | ~25 |

21

| SWITCHING CODE | SWITCHING CONTENT |
|---|---|
| 0xF040 | USE EXTERNAL CHARACTER OR APPARATUS |
| 0xF041 | SWITCH TO GROUP NUMBER 00 |
| ⋮ | ⋮ |
| 0xF140 | SWITCH TO GROUP NUMBER FF |

| FONT NUMBER | FONT NAME |
|---|---|
| 00 00 | MINCHO TYPEFACE-00-00 |
| 00 01 | MINCHO TYPEFACE-00-01 |
| 00 02 | MINCHO TYPEFACE-00-02 |
| 00 03 | MINCHO TYPEFACE-00-03 |
| 00 04 | MINCHO TYPEFACE-00-04 |
| 00 05 | MINCHO TYPEFACE-00-05 |
| 00 06 | MINCHO TYPEFACE-00-06 |
| 00 07 | MINCHO TYPEFACE-00-07 |
| : | : |
| FF FF | MINCHO TYPEFACE-FF-FF |

| GROUP NUMBER | PLANE | CHARACTER NUMBER | FONT CODE | FONT NUMBER |
|---|---|---|---|---|
| 00 | 00 | 0x0065 | 0x8140 | 00 00 |
| .. | .. | .. | .. | .. |
| 00 | 00 | 0x01BF | 0x82CD | 00 00 |
| .. | .. | .. | .. | .. |
| 00 | 00 | 0x0BDB | 0x8FC1 | 00 00 |
| .. | .. | .. | .. | .. |
| 00 | 00 | 0x2775 | 0x8140 | 00 01 |
| .. | .. | .. | .. | .. |
| 00 | 00 | 0x59FB | 0x8FC1 | 00 02 |
| .. | .. | .. | .. | .. |
| 00 | 00 | 0xFC52 | 0x979E | 00 08 |
| .. | .. | .. | .. | .. |

| LOGIC CODE | SHIFT-JIS CODE | UNICODE |
|---|---|---|
| 0x00 00 0065 | 0x8140 | 0x3000 |
| : | : | : |
| 0x00 00 01BF | 0x82CD | 0x306F |
| : | : | : |
| 0x00 00 0BDB | 0x8FC1 | 0x6D88 |
| : | : | : |
| 0x00 00 2775 | 0x8145 | 0x3000 |
| : | : | : |
| 0x00 00 59FB | 0x8145 | 0x304B |
| : | : | : |
| 0x00 00 FC52 | 0x8145 | 0x304B |

FIG.10

| FONT CODE | FONT NAME [MINCHO TYPEFACE-00-00] CHARACTER PATTERN |
|---|---|
| 0x8140 | |
| 0x8D40 | 后 (C11) |
| 0x8D41 | 喉 |
| 0x8FFB | 墙 |
| 0x8FFC | 饰 |
| 0x979E | 璃 |

| FONT CODE | FONT NAME [MINCHO TYPEFACE-00-01] CHARACTER PATTERN |
|---|---|
| 0x8140 | ㄅ |
| 0x8D40 | 琢 (C12) |
| 0x8D41 | 瑤 |
| 0x8FFB | 絈 |
| 0x8FFC | 紝 |
| 0x979E | 鳥骨 |

| FONT CODE | FONT NAME [MINCHO TYPEFACE-00-02] CHARACTER PATTERN |
|---|---|
| 0x8140 | |
| 0x8D40 | 歲 (C13) |
| 0x8D41 | 磾 |
| 0x8FFB | 憵 |
| 0x8FFC | 憳 |
| 0x979E | 瘂 |

| SWITCHING CODE | SWITCHING CONTENT |
|---|---|
| 0xF040 | USE EXTERNAL CHARACTER OF APPARATUS |
| 0xF041 | SWITCH TO PLANE NUMBER |
| ⋮ | ⋮ |
| 0xF140 | SWITCH TO PLANE NUMBER FF |

| FONT NUMBER | FONT NAME |
|---|---|
| 00 | MINCHO TYPEFACE-00 |
| 01 | MINCHO TYPEFACE-01 |
| 02 | MINCHO TYPEFACE-02 |
| 03 | MINCHO TYPEFACE-03 |
| 04 | MINCHO TYPEFACE-04 |
| 05 | MINCHO TYPEFACE-05 |
| 06 | MINCHO TYPEFACE-06 |
| 07 | MINCHO TYPEFACE-07 |
| : | : |
| FF | MINCHO TYPEFACE-FF |

FIG.14

| PLANE | CHARACTER NUMBER | FONT CODE | FONT NUMBER |
|---|---|---|---|
| 00 | 0x0065 | 0x8140 | 00 |
| .. | .. | .. | .. |
| 00 | 0x01BF | 0x82CD | 00 |
| .. | .. | .. | .. |
| 00 | 0x0BDB | 0x8FC1 | 00 |
| .. | .. | .. | .. |
| 00 | 0x2775 | 0x8140 | 01 |
| .. | .. | .. | .. |
| 00 | 0x59FB | 0x8FC1 | 02 |
| .. | .. | .. | .. |
| 00 | 0xFC52 | 0x979E | 08 |
| .. | .. | .. | .. |

| LOGIC CODE | SHIFT-JIS CODE | UNICODE |
|---|---|---|
| 0x00 0065 | 0x8140 | 0x3000 |
| : | : | : |
| 0x00 01BF | 0x82CD | 0x306F |
| : | : | : |
| 0x00 0BDB | 0x8FC1 | 0x6D88 |
| : | : | : |
| 0x00 2775 | 0x8145 | 0x3000 |
| : | : | : |
| 0x00 59FB | 0x8145 | 0x304B |
| : | : | : |
| 0x00 FC52 | 0x8145 | 0x304B |

FIG.16

| OUTPUT | C1<br>爸 IS ORIGINAL CHARACTER OF 恪 |
|---|---|
| | SWITCHING CODE PROCESS |
| DATA FORMAT | [PLANE CODE][CHARACTER CODE][TEXT] |
| EXAMPLE OF FORMAT | ・59FB IS ORIGINAL CHARACTER OF 恪 |
| DATA STORAGE METHOD TO DATABASE, ETC. | STORAGE POSSIBLE IN GENERAL TEXT DATA |
| CONVERSION INTO OTHER CODE | CONVERSION PROCESS POSSIBLE BY REFERRING TO CHARACTER (CODE) |

CHARACTER INFORMATION PROCESSING APPARATUS, CHARACTER INFORMATION PROCESSING METHOD AND STORAGE MEDIUM

This application claims the benefit of a Japanese Patent Application No.2000-386034 filed Dec. 19, 2000, in the Japanese Patent Office, the disclosure of which is hereby incorporated by reference.

BACKGROUND OF THE INVENTION

1. Field of the Invention

The present invention generally relates to character information processing apparatuses, character information processing methods and storage media, and more particularly to a character information processing apparatus and a character information processing method which enable input of a character code which is registered as an external character in addition to predefined character codes, and to a computer readable storage medium which stores a program for causing a computer to enable input of such a character code which is registered as the external character.

Generally, character codes processed by a processing system include a character code which is predefined by the processing system, and a character code which can be arbitrarily allocated by the user. The predefined code relates to the so-called internal character, and the arbitrarily allocated character code relates to the so-called external character.

2. Description of the Related Art

Conventionally, when the number of characters exceeds a tolerable number of the processing system, an external character file management is made by changing the external character file or appropriately adjusting characters which are registered in the external character file. Alternatively, logic codes are divided into font files which are usable in a plurality of processing systems. When the logic codes are divided into the font files, a logic character set is stored in the data by adding font information or the like to the data.

FIG. 1 is a diagram for explaining one example of a conventional font specifying process. The conventional font specifying process uses a data format shown in FIG. 1 including {¦¥font ¥ [font name]{¥ text[text data]}}. In other words, a font file for displaying or printing the "text data" is determined by the "font name".

As a method of setting characters other than the external characters by the conventional font specifying process, there is a proposal to store divided logic codes in different font files.

The data of the character string shown in FIG. 1 include {¦¥font ¦¥Mincho typeface-00-01 {¥ text ¥ {消 }}{¥ font ¥ Mincho typeface-00-00 {¦¥text is original character of 格}}. A character code of a character C1 is stored in, that is, defined by, the character 消 of the Mincho typeface-00-01.

In this specification, the "original character" refers to a character which corresponds to a synonym having the same pronunciation (or Japanese rendering) as another character in Japanese. In other words, the "original character" is a Japanese Kanji character having the same meaning and the same pronunciation as another Japanese Kanji character which has a different character shape or structure. There is no exact counterpart of the "original character" in English, because a character or symbol string in English does not have the same meaning and the same pronunciation as another character or symbol string.

Accordingly, in the conventional font specifying process, it is necessary to employ a data format which is added with the font information when storing the data in a database or the like. In addition, it is necessary to judge the font information when converting the character code into another general code.

However, according to the conventional font specifying process, it is necessary to add the font name when specifying a character which is registered under another font name. For this reason, it is not possible to specify the character in the normal text format. As a result, there is a problem in that the processing of the data is difficult and complex.

SUMMARY OF THE INVENTION

Accordingly, it is a general object of the present invention to provide a novel and useful character information processing apparatus, character information processing method and computer-readable storage medium, in which the problem described above is eliminated.

Another and more specific object of the present invention is to provide a character information processing apparatus, character information processing method and computer-readable storage medium, in which the processing of data is simple.

Still another object of the present invention is to provide a character information processing apparatus which outputs a character pattern corresponding to an input data, comprising a logic code acquiring unit which acquires a logic code based on the input data, a code converting unit which converts the logic code acquired by the logic code acquiring unit into a font number and a character code, and an output unit which outputs a character pattern depending on the character code, by use of a font file corresponding to the font number obtained by the code converting unit. According to the character information processing apparatus of the present invention, it is possible to expand the number of characters without having to add a special expansion code, because the logic code is acquired from the input data.

A further object of the present invention is to provide a character information processing apparatus which outputs a character pattern corresponding to an input data, comprising a logic code acquiring unit which acquires a logic code based on the input data, a logic code transfer unit which transfers the logic code acquired by the logic code acquiring unit to a transfer destination, a receiving unit which receives a character pattern from the transfer destination in response to the logic code which is transferred by the logic code transfer unit, and an output unit which outputs the character pattern which is received by the receiving unit. According to the character information processing apparatus of the present invention, it is possible to expand the number of characters without having to add a special expansion code, because the logic code is acquired from the input data.

Another object of the present invention is to provide a character information processing apparatus which outputs a character pattern corresponding to an input data, comprising a receiving unit which receives a logic code corresponding to the input data from a transfer source, a code converting unit which converts the logic code received by the receiving unit into a font number and a character code, a character pattern generating unit which generates a character pattern depending on the character code, using a font file corresponding to the font number which is obtained by the code converting unit, and a transfer unit which transfers the character pattern generated by the character pattern generating unit to the transfer source. According to the character information processing apparatus of the present invention, it is possible to expand the number of characters without having to add a special expansion code, because the logic code is acquired from the input data.

Still another object of the present invention is to provide a client-server system comprising at least one client terminal, and a server which is coupled to the at least one client terminal, where the at least one client terminal includes an acquiring unit which acquires a logic code from an input data, a first transfer unit which transfers the logic code to the server, and an output unit which outputs a character pattern which is received from the server in response to the logic code transferred to the server, and the server includes a code converting unit which converts the logic code received from the at least one client terminal into a font number and a character code, and a second transfer unit which transfers the character pattern depending on the character code to the at least one client terminal, using a font file corresponding to the font number obtained by the code converting unit. According to the client-server system of the present invention, the structure of the client terminal can be simplified, because the client terminal does not need to generate all character patterns. In addition, by acquiring the logic code only from a predetermined input data in the client terminal and transferring the logic code to the server, it becomes possible to reduce the processing load on the server.

Moreover, instead of converting the logic code into the font number and the character code to obtain the character pattern corresponding to the character code by use of the font file, the server may extract the code system and the character code from the logic code, and obtain the character pattern corresponding to the character code. In this case, it is also possible to simplify the structure of the client terminal, because the client terminal does not need to generate all character patterns.

A further object of the present invention is to provide a character information processing method which outputs a character pattern corresponding to an input data, comprising the steps of (a) acquiring a logic code based on the input data, (b) converting the logic code acquired by the step (a) into a font number and a character code, and (c) outputting a character pattern depending on the character code, by use of a font file corresponding to the font number obtained by the step (b). According to the character information processing method of the present invention, it is possible to expand the number of characters without having to add a special expansion code, because the logic code is acquired from the input data.

Another object of the present invention is to provide a character information processing method which outputs a character pattern corresponding to an input data, comprising the steps of (a) acquiring a logic code based on the input data, (b) transferring the logic code acquired by the step (a) to a transfer destination, (c) receiving a character pattern from the transfer destination in response to the logic code which is transferred by the step (b), and (d) outputting the character pattern which is received by the step (c). According to the character information processing method of the present invention, it is possible to expand the number of characters without having to add a special expansion code, because the logic code is acquired from the input data.

Still another object of the present invention is to provide a character information processing method which outputs a character pattern corresponding to an input data, comprising the steps of (a) receiving a logic code corresponding to the input data from a transfer source, (b) converting the logic code received by the step (a) into a font number and a character code, (c) generating a character pattern depending on the character code, using a font file corresponding to the font number which is obtained by the step (b), and (d) transferring the character pattern generated by the step (c) to the transfer source. According to the character information processing method of the present invention, it is possible to expand the number of characters without having to add a special expansion code, because the logic code is acquired from the input data.

A further object of the present invention is to provide a character information processing method adapted to a client-server system having at least one client terminal and a server which is coupled to the at least one client terminal, comprising the steps of (a) acquiring a logic code from an input data, transferring the logic code to the server, and outputting a character pattern which is received from the server in response to the logic code transferred to the server, in the at least one client terminal, and (b) converting the logic code received from the at least one client terminal into a font number and a character code, and transferring the character pattern depending on the character code to the at least one client terminal, using a font file corresponding to the font number, in the server. According to the character information processing method of the present invention, the structure of the client terminal can be simplified, because the client terminal does not need to generate all character patterns. In addition, by acquiring the logic code only from a predetermined input data in the client terminal and transferring the logic code to the server, it becomes possible to reduce the processing load on the server.

Moreover, instead of converting the logic code into the font number and the character code to obtain the character pattern corresponding to the character code by use of the font file, the server may extract the code system and the character code from the logic code, and obtain the character pattern corresponding to the character code. In this case, it is also possible to simplify the structure of the client terminal, because the client terminal does not need to generate all character patterns.

Another object of the present invention is to provide a computer-readable storage medium which stores a program for causing a computer to output a character pattern corresponding to an input data, where the program comprises an acquiring procedure which causes the computer to acquire a logic code based on the input data, a code converting procedure which causes the computer to convert the logic code acquired by the acquiring procedure into a font number and a character code, and an output procedure which causes the computer to output a character pattern depending on the character code, by use of a font file corresponding to the font number obtained by the code converting procedure. According to the computer-readable storage medium of the present invention, it is possible to expand the number of characters without having to add a special expansion code, because the logic code is acquired from the input data.

Still another object of the present invention is to provide a computer-readable storage medium which stores a program for causing a computer to output a character pattern corresponding to an input data, where the program comprises an acquiring procedure which causes the computer to acquire a logic code based on the input data, a transferring procedure which causes the computer to transfer the logic code acquired by the acquiring procedure to a transfer destination, a receiving procedure which causes the computer to receive a character pattern from the transfer destination in response to the logic code which is transferred by the transferring procedure, and an output procedure which causes the computer to output the character pattern which is received by the receiving procedure. According to the computer-readable storage medium of the present invention, it is possible to expand the number of characters without having to add a special expansion code, because the logic code is acquired from the input data.

A further object of the present invention is to provide a computer-readable storage medium which stores a program for causing a computer to output a character pattern corresponding to an input data, where the program comprises a receiving procedure which causes the computer to receive a logic code corresponding to the input data from a transfer source, a code converting procedure which causes the computer to convert the logic code received by the receiving procedure into a font number and a character code, a generating procedure which causes the computer to generate a character pattern depending on the character code, using a font file corresponding to the font number which is obtained by the code converting procedure, and a transfer procedure which causes the computer to transfer the character pattern generated by the generating procedure to the transfer source. According to the computer-readable storage medium of the present invention, it is possible to expand the number of characters without having to add a special expansion code, because the logic code is acquired from the input data.

Other objects and further features of the present invention will be apparent from the following detailed description when read in conjunction with the accompanying drawings.

DESCRIPTION OF THE PREFERRED EMBODIMENTS

FIG. 1 is a diagram for explaining one example of a conventional font specifying process;

FIG. 2 is a system block diagram showing a first embodiment of a character information processing apparatus according to the present invention;

FIG. 3 is diagram showing a data structure of a logic code employed in the first embodiment;

FIG. 4 is a diagram for explaining a logic code representation format employed in the first embodiment;

FIG. 7 is a diagram showing a structure of a font name conversion table employed in the first embodiment;

FIG. 8 is a diagram showing a structure of a font code conversion table employed in the first embodiment;

FIG. 9 is a diagram showing a structure of a logic code conversion table employed in the first embodiment;

FIG. 10 is a diagram for explaining storage of character patterns in the first embodiment;

FIG. 12 is a diagram showing a structure of a plane switching table employed in a second embodiment of the character information processing apparatus according to the present invention;

FIG. 13 is a diagram showing a structure of a font name conversion table employed in the second embodiment;

FIG. 14 is a diagram showing a structure of a font code conversion table employed in the second embodiment;

FIG. 15 is a diagram showing a structure of a logic code conversion table employed in the second embodiment;

FIG. 16 is a diagram for explaining the operation of the second embodiment;

DESCRIPTION OF THE PREFERRED EMBODIMENTS

Figures 5, 6:
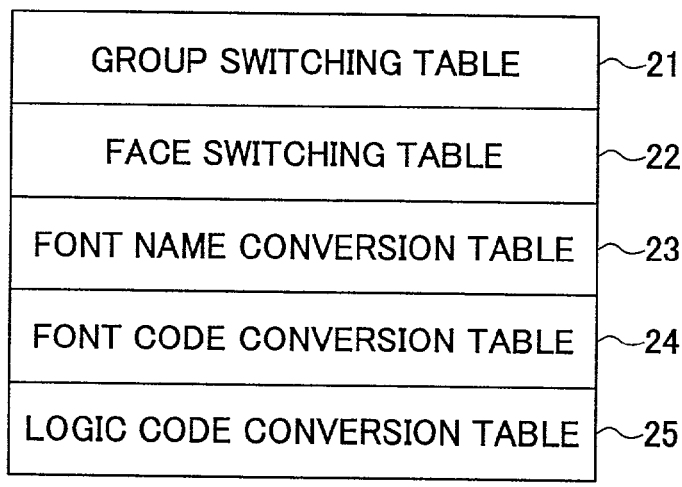
FIG. 5 is a diagram for explaining a data structure of a code conversion table employed in the first embodiment.
FIG. 6 is a diagram showing a structure of a group switching table employed in the first embodiment.

FIG. 2 is a system block diagram showing a first embodiment of a character information processing apparatus according to the present invention. In this first embodiment of the character information processing apparatus, the present invention is applied to a character input apparatus. Further, this first embodiment of the character information processing apparatus employs a first embodiment of a character information processing method according to the present invention and a first embodiment of a computer-readable storage medium according to the present invention.

A character input apparatus 1 shown in FIG. 2 includes an input section 2, a display section 3, a printer section 4, an auxiliary storage unit 5, a CPU 6, and a RAM 7.

The input section 2 is formed by a keyboard or the like, and is used to input information such as alphanumeric characters and Japanese Kanji characters. The display section 3 displays the input information which is input from the input section 2, and information such as text which is converted based on the input information. The printer section 4 prints the input information which is input from the input section 2, and the displayed information which is displayed on the display section 3.

The auxiliary storage unit 5 stores a conversion program which is stored in the first embodiment of the computer-readable storage medium, and various kinds of data used for a character conversion. A conversion data part 10 stored in the auxiliary storage unit 5 includes a code conversion table 11, a font data part 12, a document data part 13, and a database part 14.

The code conversion table 11 is made up of a plurality of conversion tables, and is used to convert a logic code which is dependent on the operation made from the input section 2 into a font code. The font data part 12 stores font data depending on logic codes. The document data part 13 stores text information of a character string which is determined depending on the operation made from the input section 2. The database part 14 stores the text information of the input character string in the form of a file.

Next, a description will be given of the logic code which is used in this embodiment.

FIG. 3 is a diagram showing a data structure of the logic code employed in this embodiment. As shown in FIG. 3, each logic code includes a group number, a plane number, and a character number. For example, the logic code is formed by a 10-digit hexadecimal number. The group number corresponds to a sequence of the third and fourth digits of the logic code. The plane number corresponds to a sequence of the first, second, fifth and sixth digits of the logic code. Furthermore, the character number corresponds to a sequence of the digits excluding the third through sixth digits of the logic code.

When the logic code is "0x00 00 0000" as shown in FIG. 3, for example, the group number is "00" which is the sequence of the third and fourth digits of the logic code. In this case, the plane number is "0x00" which is the sequence of the first, second fifth and sixth digits of the logic code. In addition, the character number is "0x0000" which is the sequence of the digits excluding the third through sixth digits of the logic code.

The character number makes a round when a sequence of the seventh through tenth digits of the logic code changes from "0000" to "FFFF". The plane number makes one round when a sequence of the fifth and sixth digits of the logic code changes from "00" to "FF". In this state, the character number is repeated a number of times corresponding to the number of plane numbers. For this reason, when the number of character numbers is denoted by "a" and the number of the plane numbers is denoted by "b", it is possible to identify (a×b) codes by the plane number and the character number.

The group number makes a round when a sequence of the third and fourth digits of the logic code changes from "00" to "FF". In this state, the plane number is repeated a number of times corresponding to the number of group numbers. For this reason, when the number of group numbers is denoted by "c", it is possible to identify (a×b×c) codes by the group number, the plane number and the character number.

Next, a description will be given of a logic code representation format of a Shift-JIS system.

FIG. 4 is a diagram for explaining the logic code representation format employed in the first embodiment.

The logic code representation format can be categorized into a group switching type and a plane switching type.

As shown in FIG. 4, the group switching type logic code representation format represents the logic code by "[group code][plane code][character number]". In addition, an example of this logic code representation format is ".0059FB", and an example of the code display is "0xF041 0x30 0x30 0x35 0x39 0x46 0x42".

On the other hand, as shown in FIG. 4, the plane switching type logic code representation format represents the logic code by "[plane code][character number]". In addition, an example of this logic code representation format is ".59FB", and an example of the code display is "0xF041 0x35 0x39 0x46 0x42".

The code conversion table 11 is used to obtain the font from the logic code described above.

Next, a description will be given of the code conversion table.

FIG. 5 is a diagram for explaining a data structure of the code conversion table 11 employed in the first embodiment. As shown in FIG. 5, the code conversion table 11 includes a group switching table 21, a plane switching table 22, a font name conversion table 23, a font code conversion table 24, and a logic code conversion table 25.

The group switching table 21 is used for specifying a font data group which is to be used, by the group switching code within the logic code. The plane switching table 22 is used for specifying a front data plane which is to be used, by the plane switching code within the logic code.

The font name conversion table 23 is used for specifying a font name depending on the font number. The font code conversion table 24 is used for specifying a font code depending on the plane number, the group number and the character number. The logic code conversion table 25 is used for converting the logic code into a Shift-JIS code, a unicode or the like.

Next, a description will be given of the group switching table 21.

FIG. 6 is a diagram showing a structure of the group switching table 21 employed in the first embodiment. In this embodiment, the group switching table 21 stores switching contents for each of the switching codes. As shown in FIG. 6, a switching code "0xF040" indicates that an external character of the character input apparatus 1 is used. In addition, a switching code "0xF041" indicates that a character which is set with a group number "00" is used. Further, a switching code "0xF140" indicates that a character which is set with a group number "FF" is used. Hence, the group number corresponding to the switching code can be detected from the group switching table 21.

Next, a description will be given of the font name conversion table 23.

FIG. 7 is a diagram showing a structure of the font name conversion table 23 employed in the first embodiment. The font name conversion table 23 stores font names depending on the font numbers. In FIG. 7, a font number "00 00" corresponds to a font name "Mincho typeface-00-00", a font number "00 01" corresponds to a font name "Mincho typeface-00-01", . . . , and a font number "FF FF" corresponds to a font name "Mincho typeface-FF-FF". Thus, the font name can be detected from the font number by use of the font name conversion table 23.

If a predetermined rule exists between the font number and the font name, the font name corresponding to the font number (group number or plane number) may be obtained by adding the font number after "Mincho typeface-", for example, without using a table. A range of the font number is determined by a bit length of the font number in the font code conversion table 24 which will be described later in conjunction with FIG. 8. Especially when a font of a certain font number is matched to a general code of the character input apparatus 1, this font is treated as a standard font. For example, when the font is made the same as a Shift-JIS character set, for example, "Mincho typeface-00-00" is referred to as the standard font.

Next, a description will be given of the font code conversion table 24.

FIG. 8 is a diagram showing a structure of the font code conversion table 24 employed in the first embodiment. The font code conversion table 24 stores the font codes and the font numbers in correspondence with the group numbers, the plane numbers and the character numbers, as shown in FIG. 8.

For example, in the case shown in FIG. 8, the group number "00", the plane number "00" and the character number "0x0065" correspond to the font code "0x8140" and the font number "00 00", and the group number "00", the plane number "00" and the character number "0x2775" correspond to the font code "0x8140" and the font number "00 01". In addition, the group number "00", the plane number "00" and the character number "0x59FB" correspond to the font code "0x8FC1" and the font number "00 02", and the group number "00", the plane number "00" and the character number "0xFC52" correspond to the font code "0x979E" and the font number "00 08". Hence, the font code and the font number corresponding to the group number, the plane number and the character number can be detected from the font code conversion table 24.

Next, a description will be given of the logic code conversion table 25.

FIG. 9 is a diagram showing a structure of the logic code conversion table 25 employed in the first embodiment. The logic code conversion table 25 stores Shift-JIS codes and unicodes in correspondence with the logic codes.

For example, in the case shown in FIG. 9, the Shift-JIS code "0x8140" and the unicode "0x3000" are stored in correspondence with the logic code "0x00 00 0065", and the Shift-JIS code "0x82CD" and the unicode "0x306F" are stored in correspondence with the logic code "0x00 00 01BF". Accordingly, the logic code can be converted into the Shift-JIS code and the unicode by use of the logic code conversion table 25.

Next, a description will be given of storage of character patterns.

FIG. 10 is a diagram for explaining the storage of the character patterns in the first embodiment. The character patterns depending on the font code are stored for each font name, and the character pattern defined by a corresponding logic code is stored for each font.

For example, for the font code "0x8D40", a character pattern "后" of a character C11 is stored for the font name "Mincho typeface-00-00", a character pattern "冢" of a character C12 is stored for the font name "Mincho typeface-00-01", and a character pattern "島" of a character C13 is stored for the font name "Mincho typeface-00-02".

The CPU 6 carries out a data conversion using the various tables of the conversion data part 10. Returning now to the description of the CPU 6 shown in FIG. 2, the CPU 6 carries out various functions by executing a conversion program which is stored in the first embodiment of the computer-readable storage medium according to the present invention. The computer-readable storage medium may be formed by the auxiliary storage unit 5, the RAM 7 or any suitable means capable of storing a program, such as magnetic, optical and magneto-optical disks and cards, and semiconductor memory devices. The functions carried out by the CPU 6 include the functions of a processing section 31 and a logic code output section 32.

The processing section 31 processes the text which is added with the logic code and is input from the input section 2. This processing section 31 includes a switch judging part 41, a logic code acquiring part 42, and a logic code converting part 43.

The switch judging part 41 detects a switching code from the text which is added with the logic code. The logic code acquiring part 42 acquires the logic code by extracting the logic code from the text which is added with the logic code. The logic code converting part 43 obtains the Shift-JIS code and the unicode from the logic code, based on the logic code conversion table 25 shown in FIG. 9.

The logic code output section 32 generates and outputs a character pattern depending on the logic code. This logic code output section 32 includes a font control part 51 and a character output part 52.

The font control part 51 selects the font for outputting the character pattern of the logic code, based on the font name conversion table 23 shown in FIG. 7. The character output part 52 generates and outputs the character pattern based on the font code conversion table 24 shown in FIG. 8.

Next, a description will be given of the functions realized by the CPU 6 which executes the conversion program.

Figure 11:
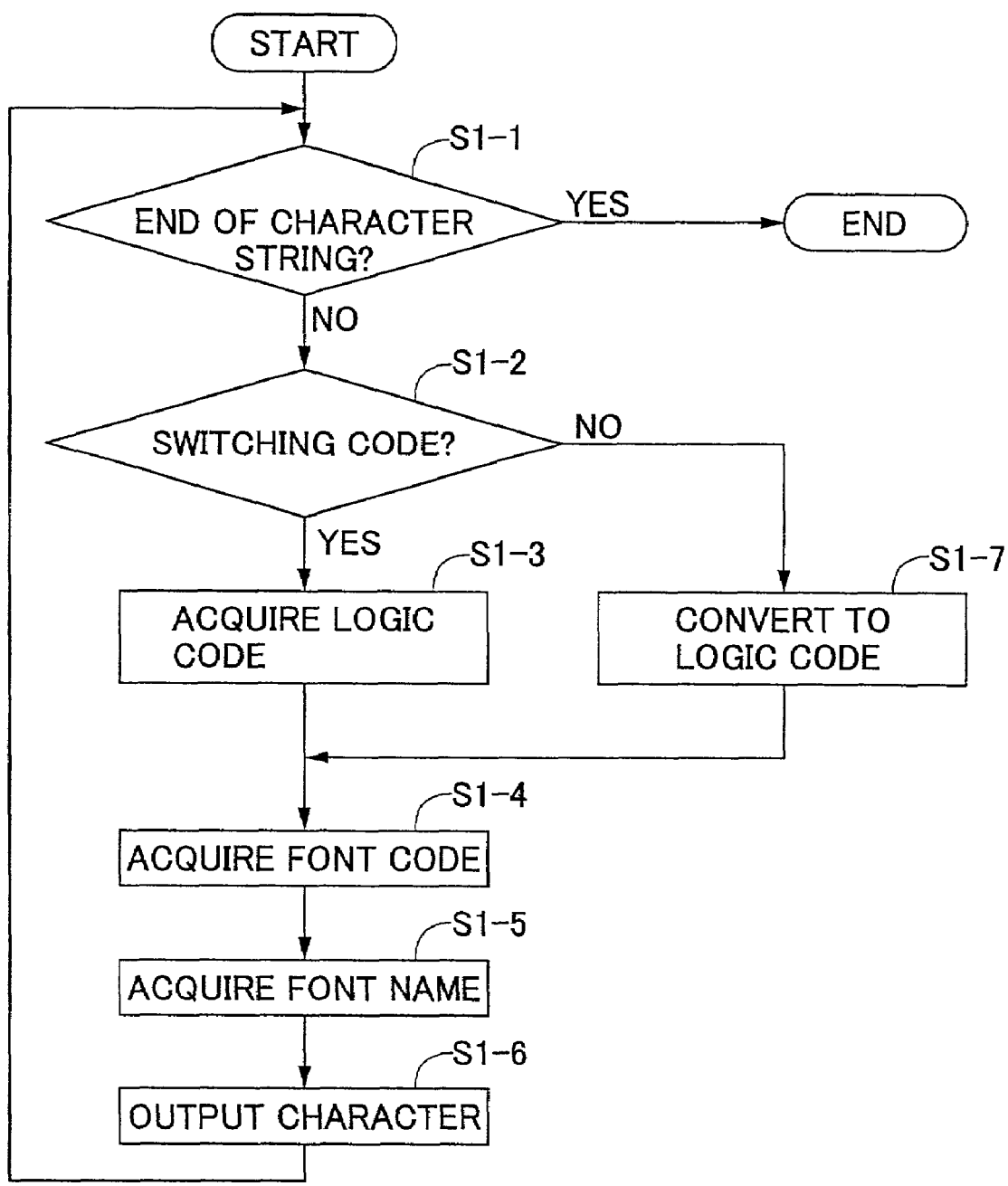
FIG. 11 is a flow chart for explaining a conversion process of the first embodiment.

FIG. 11 is a flow chart for explaining a conversion process of the first embodiment. For the sake of convenience, a description will be given for a case where the text which is added with the logic code is ".0059FB は格の本字" which means ".0059FB is original character of 格" in English. More particularly, "は" means "is", and "格の本字" means "original character of 格" in English. The conversion program of this embodiment includes steps S1-1 through S1-7.

As described above, the "original character" refers to a character which corresponds to a synonym having the same pronunciation (or Japanese rendering) as another character in Japanese. In other words, the "original character" is a Japanese Kanji character having the same meaning and the same pronunciation as another Japanese Kanji character which has a different character shape or structure. There is no exact counterpart of the "original character" in English, because there are no character or symbol strings having different shapes or structures (for example, different spellings) in English which have the same meaning and the same pronunciation.

The step S1-1 decides whether or not the end of a character string is reached. This step S1-1 is carried out by the processing section 31 shown in FIG. 2, to detect the end of the character string which is to be subjected to a display process or a print process. The process ends if the decision result in the step S1-1 is YES.

On the other hand, if the decision result in the step S1-1 is NO, the step S1-2 decides whether or not a switching code is detected. This step S1-2 is carried out by the switch judging part 41 shown in FIG. 2. More particularly, this step S1-2 extracts one character from the character string, and uses the group switching table 21 shown in FIG. 6 to determine whether or not a switching code to the group of the group switching table 21 exists. In this particular case, the extracted one character is ".". This character "." is defined by an operating system (OS) of the character input apparatus 1 as a substitute character pattern of an undefined character, and indicates text data using the external character code.

A code "0xF041" is set as the external character code at the position of this character ".". Hence, this code "0xF041" is detected as the switching code. This detected switching code "0xF041" corresponds to the group number "00".

The process advances to the step S1-3 if the decision result in the step S1-2 is YES. This step S1-3 is carried out by the logic code acquiring part 42 shown in FIG. 2. In this particular case, this step S1-3 extracts the group number "00" because the switching code "." is "0xF041" from FIG. 6, extracts the plane number "00" from the two digits "00" which follow ".", and extracts the character number "0x59FB" from "0059FB" which follows ".". As a result, the logic code "0x00 00 59FB" is obtained from the group number, the plane number and the character number. The process advances to the step S1-4 after the step S1-3.

On the other hand, the process advances to the step S1-7 if the decision result in the step S1-2 is NO. This step S1-7 converts a code having no switching code into the logic code. This step S1-7 is carried out by the logic code converting part 43 shown in FIG. 2. Hence, this step S1-7 converts the character code which is judged as being normal text information by the step S1-2 into the logic code. The process advances to the step S1-4 after the step S1-7.

The step S1-4 acquires the font code from the logic code which is acquired by the step S1-3 or the step S1-7. This step S1-4 is carried out by the font control part 51 shown in FIG. 2. This step S1-4 uses the font code conversion table 24 shown in FIG. 8 to acquire the font code which indicates the storage location of the character pattern to be displayed and the font number which specifies the font name. In this particular case, the font code "0x8FC1" and the font number "0002" are acquired from the group number "00", the plane number "00" and the character number "0x59FB".

The step S1-5 acquires the font name from the font number which is acquired by the step S1-4. This step S1-5 is carried out by the font control part 51 shown in FIG. 2. This step S1-5 uses the font name conversion table 23 shown in FIG. 7 to acquires the font name from the font number. In this particular case, the font name "Mincho typeface-00-02" is acquired from the font number "0002". The process advances to the step S1-6 after the step S1-5.

The step S1-6 outputs the character with a font having the font name which is acquired by the step S1-5. This step S1-6 is carried out by the character output part 52 shown in FIG. 2. This step S1-6 generates a character pattern using the font name (font file) which is acquired by the step S1-5 and the font code which is acquired by the step S1-4, and outputs the character pattern to be displayed on the display section 3 or to be printed by the printer section 4. In this particular case, the character C1 is displayed on the display section 3 and/or printed by the printer section 4. The process returns to the step S1-1 after the step S1-6.

In the text "·0059FB は株の本字", "は" which means "is" in English does not have a switching code. Hence, the conversion into the logic code is carried out by the step S1-7 with respect to "は". In other words, with respect to "は", the Shift-JIS code "0x82CD" is converted into the logic code "0x00 00 01BF", the group number "0x00", the plane number "0x00" and the character number "0x01BF" by the step S1-7, and the steps S1-4 through S1-6 are carried out thereafter.

When carrying out the step S1-2, a normal text "character output using standard font" may be used.

According to this embodiment, even when the logic code is divided into a plurality of fonts, it is possible to use a number of character codes exceeding the number of external characters which can be registered in the character input apparatus 1, without having to add font specifying information to the data. In addition, by directly acquiring the code information instead of the font name, it is possible to simply carry out the code conversion with respect to the logic code in the document data or database.

The embodiment described above uses the group number, but it is of course possible to use only the plane number. Hence, a description will be given of a second embodiment of the character information processing apparatus according to the present invention. In this second embodiment of the character information processing apparatus, the present invention is applied to a character input apparatus. Further, this second embodiment of the character information processing apparatus employs a second embodiment of the character information processing method according to the present invention and a second embodiment of the computer-readable storage medium according to the present invention. A basic structure of this second embodiment of the character information processing apparatus is the same as that of the first embodiment shown in FIG. 2, and a description and illustration thereof will be omitted.

When using only the plane number, a data structure of the logic code becomes different from that of the first embodiment. In addition, data structures of a (plane) switching table, the font name conversion table, the font code conversion table and the logic code table of the code conversion table of the conversion data part 10 are also different from those of the first embodiment.

In this second embodiment, the logic code is formed by an 8-digit hexadecimal number, for example. The plane number corresponds to a sequence of the third and fourth digits of the logic code, and the character number corresponds to a sequence of the digits excluding the third and fourth digits of the logic code.

For example, character input apparatus 1 of the second embodiment uses general codes such as the Shift-JIS code and the unicode, and represents the logic code by text data using the Shift-JIS code or the unicode. Hence, the logic code is extracted from such text data, and the logic code is converted into the font number and the character code (font code), to output the character code using a font file corresponding to the font number, so that the logic code can also be processed in apparatuses which use the general codes.

FIG. 12 is a diagram showing a structure of a plane switching table employed in the second embodiment of the character information processing apparatus according to the present invention. A plane switching table 61 shown in FIG. 12 stores switching contents depending on switching codes.

For example, when a switching code "0xF040" is set, an external character of the input character apparatus 1 is used. A character code having a plane number "00" is used when a switching code "0xF041" is set. Further, a character code having a plane number "FF" is used when a switching code "0xF140" is set. Hence, the plane number corresponding to the switching code can be detected from the plane switching table 61.

Next, a description will be given of a font name conversion table 62. FIG. 13 is a diagram showing a structure of the font name conversion table 62 employed in the second embodiment.

The font name conversion table 62 stores font names depending on font numbers, by regarding the plane numbers which are detected as described above as the font numbers. As shown in FIG. 13, a font number "00" corresponds to a font name "Mincho typeface-00", a font number "01" corresponds to a font name "Mincho typeface-01", . . . , and a font number "FF" corresponds to a font name "Mincho typeface-FF". Hence, the font name can be generated from a combination (for example, "Mincho typeface-01") of the font name (for example, "Mincho typeface") and the font number (for example, "01") based on the font name conversion table 62, by using the plane number which is detected as described above as the font number. In this embodiment, the font name is obtained by use of the font name conversion table 62, but it is of course possible to generate the font name from the font number.

Next, a description will be given of a font code conversion table 63. FIG. 14 is a diagram showing a structure of the font code conversion table 63 employed in the second embodiment. The font code conversion table 63 stores font codes and font numbers in correspondence with plane numbers and character numbers.

For example, as shown in FIG. 14, the font code "0x8140" and the font number "00" correspond to the plane number "00" and the character number "0x0065", and the font code "0x8140" and the font number "01" correspond to the plane number "00" and the character number "0x2775". The font code "0x8FC1" and the font number "02" correspond to the plane number "00" and the character number "0x59FB", and the font code "0x979E" and the font number "08" correspond to the plane number "00" and the character number "0xFC52". Hence, the font code and the font number corresponding to the plane number and the character number can be detected using the font code conversion table 63.

Next, a description will be given of a logic code conversion table 64. FIG. 15 is a diagram showing a structure of the logic code conversion table 64 employed in the second embodiment. The logic code conversion table 64 stores Shift-JIS codes and unicodes in correspondence with the logic codes.

For example, as shown in FIG. 15, the Shift-JIS code "0x8140" and the unicode "0x3000" are stored in correspondence with the logic code "0x00 0065", and the Shift-JIS code "0x82CD" and the unicode "0x306F" are stored in correspondence with the logic code "0x00 01BF". Thus, the logic code can be converted into the Shift-JIS code and the unicode using the logic code conversion table 64.

The plane switching table 61, the font name conversion table 62, the font code conversion table 63 and the logic code conversion table 64 described above can set the character information unit units of planes.

FIG. 16 is a diagram for explaining the operation of the second embodiment for a particular case. It is assumed for the sake of convenience that a character string "(文字C1) は格の本字" which means "(character C1) is original character of 格" in English. More particularly, "文字" means "character", "は" means is" and "格の本字" means "original character of 格" in English.

As shown in FIG. 16, the data of "(文字C1)" can be represented by [plane code][character number], and "は格の本字" can be represented by [text data]. For this reason, when the text data are presented by the normal characters, the character string "文字C1) は格の本字·" is represented as ".59FB" は 格の本字" which means ".59FB" is original character of "格". In this case, ".59FB" is set as text data, similarly to " は格の本字".

The character string "(文字C1) は格の本字" can also be converted into another code in a simple manner, by referring to the logic code conversion table 64.

In this second embodiment, the entire conversion data part 10 is stored in the auxiliary storage unit 5. However, it is possible to store a portion of the conversion data part 10 in a server, and to carry out the display and/or the printing by carrying out a communication between the server and a plurality of client terminals. Hence, a description will be given of a third embodiment of the character information processing apparatus according to the present invention. In this third embodiment of the character information processing apparatus, the present invention is applied to a character input apparatus. Further, this third embodiment of the character information processing apparatus employs a third embodiment of the character information processing method according to the present invention and a third embodiment of the computer-readable storage medium according to the present invention. In this third embodiment, the present invention is applied to a client-server system.

Figure 17:
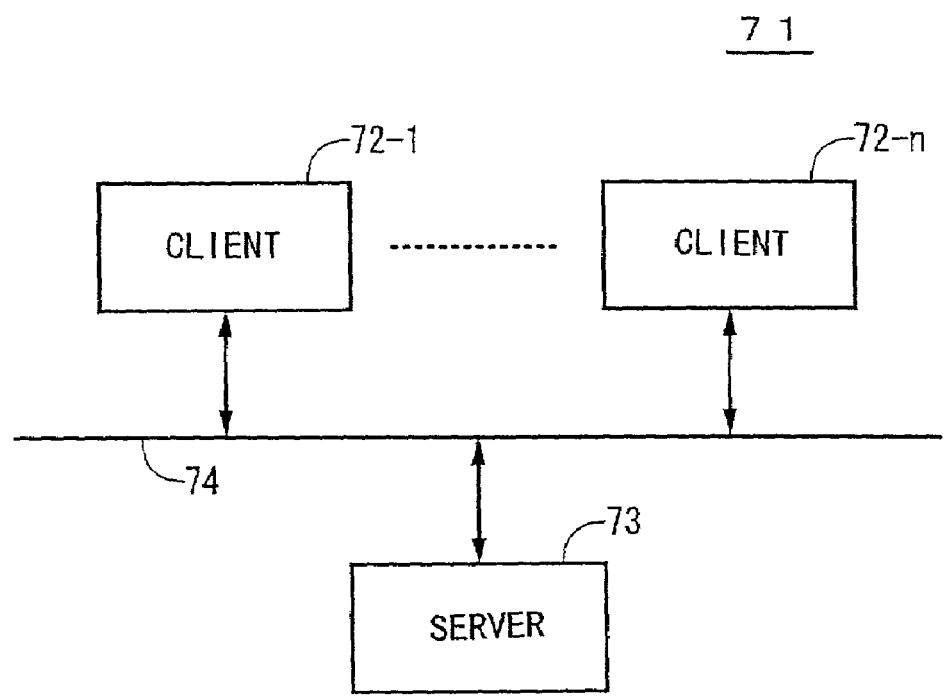
FIG. 17 is a system block diagram showing a system structure of a third embodiment of the character information processing apparatus according to the present invention.

FIG. 17 is a system block diagram showing a system structure of the third embodiment of the character information processing apparatus according to the present invention. As shown in FIG. 17, a client-server system 71 includes a plurality of client terminals 72-1 through 72-n, a server 73, and a communication means 74.

An input operation is made from at least one of the client terminals 72-1 through 72-n, and character information dependent on the input operation is displayed on the at least one of the client terminals 72-1 through 72-n from which the input operation is made. The server 73 carries out a conversion process depending on a request from the at least one of the client terminals 72-1 through 72-n, and provides the character information depending on the request with respect to the at least one of the client terminals 72-1 through 72-n which made the request. The communication means 74 connects the server 73 and the client terminals 72-1 through 72-n.

Next, a description will be given of the client terminals 72-1 through 72-n. Since the client terminals 72-1 through 72-n all have the same structure, a description will be given of an arbitrary client terminal 72-i, where i=1, . . . , n.

Figure 18:
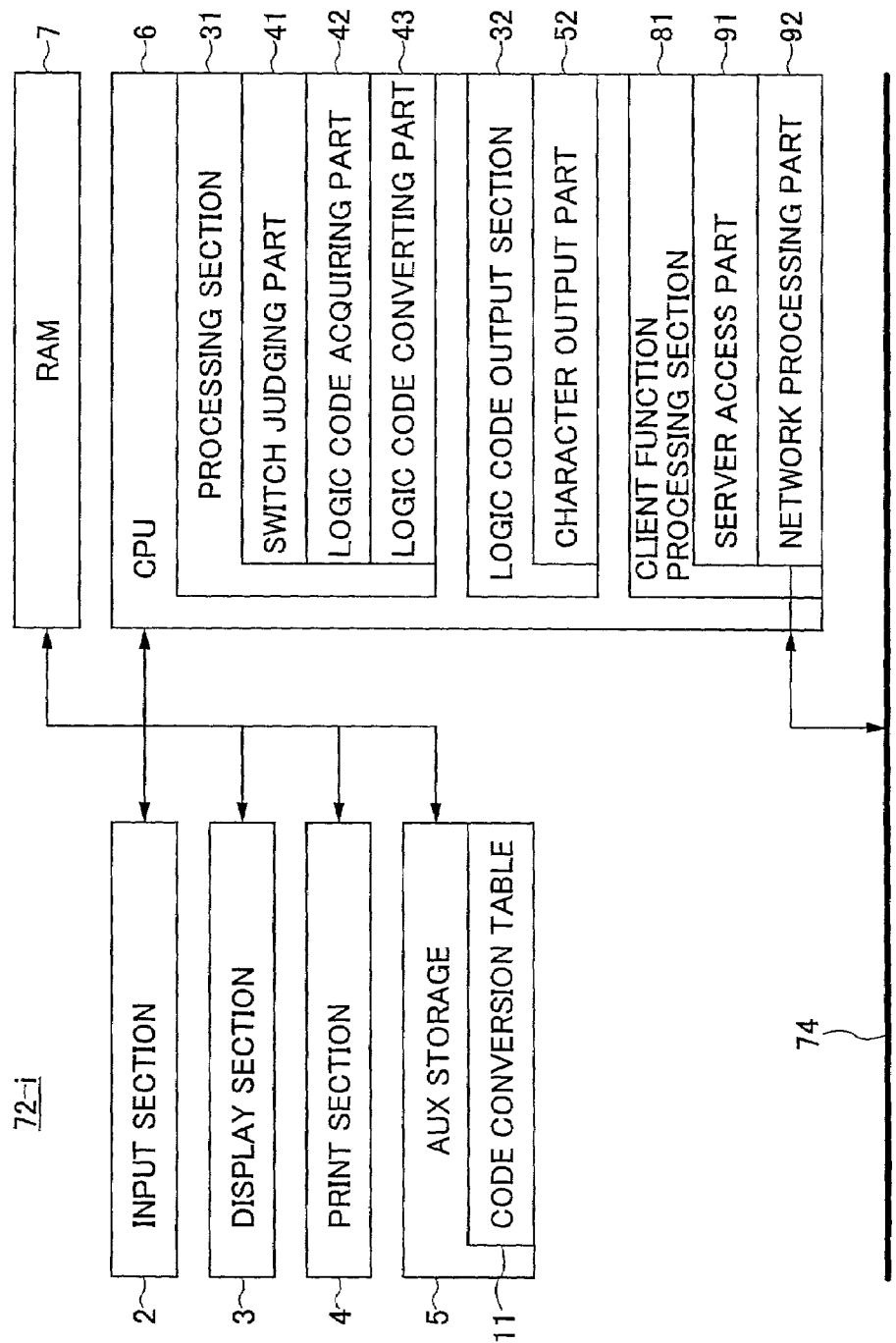
FIG. 18 is a system block diagram showing a structure of a client terminal of the third embodiment.

FIG. 18 is a system block diagram showing the structure of the client terminal 72-i of the third embodiment. In FIG. 18, those parts which are the same as those corresponding parts in FIG. 2 are designated by the same reference numerals, and a description thereof will be omitted.

As shown in FIG. 18, the client terminal 72-i is provided with a client function processing section 81, and communicates with the server 73 via the communication means 74. The client function processing section 81 includes a server access part 91 and a network processing part 92. The server access part 91 controls access to the server 73. In addition, the network processing part 92 realizes a network function such as CRP-OP between the client terminal 72-i and the server 73.

Figure 19:
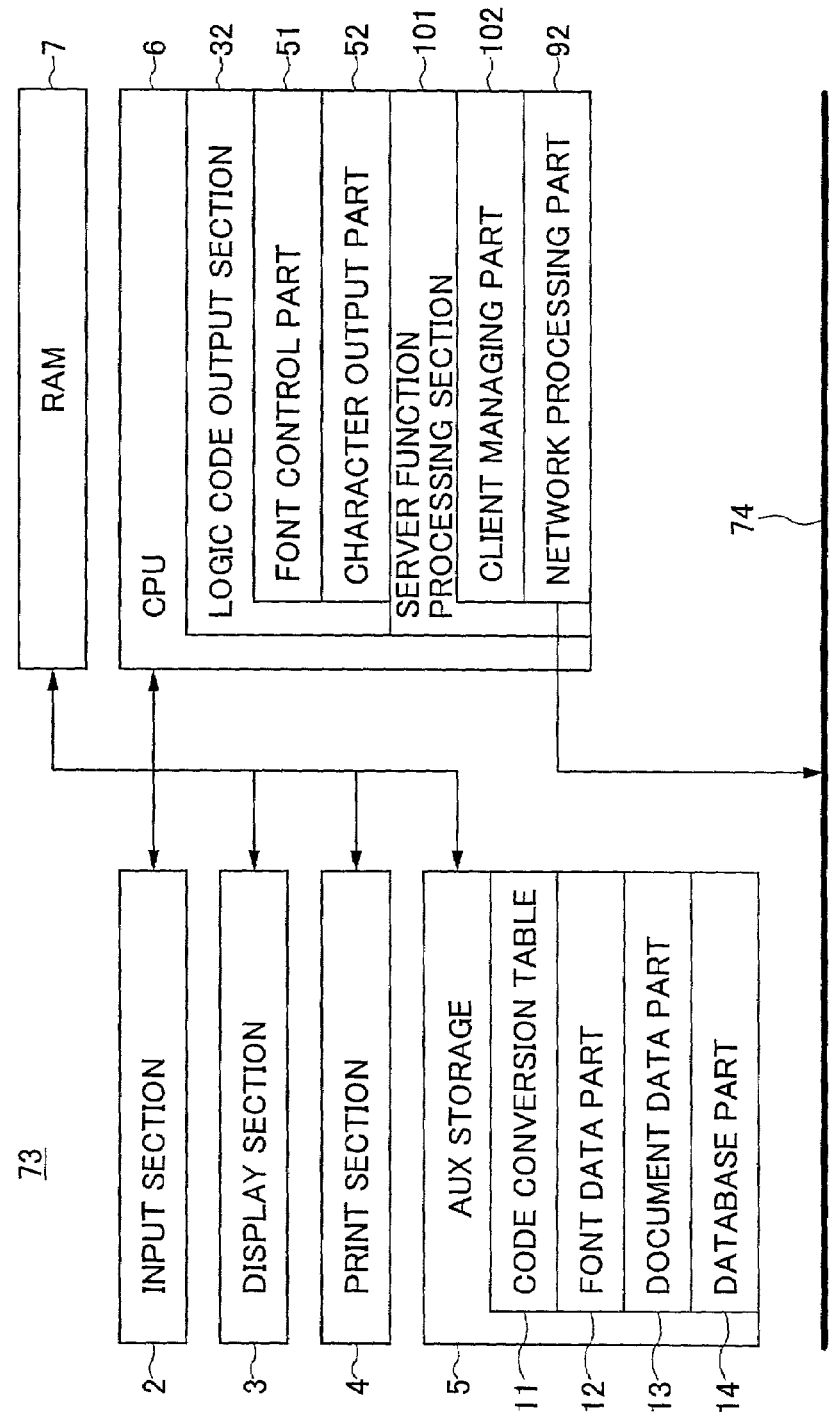
FIG. 19 is a system block diagram showing a structure of a server of the third embodiment.

Next, a description will be given of the server 73. FIG. 19 is a system block diagram showing a structure of the server 73 of the third embodiment. In FIG. 19, those parts which are the same as those corresponding parts in FIG. 2 are designated by the same reference numerals, and a description thereof will be omitted.

As shown in FIG. 19, the server 73 is provided with a server function processing section 101, and communicates with the client terminals 72-1 through 72-n via the communication means 74. The server function processing section 101 includes a client managing part 102 and a network processing part 92. The client managing part 102 manages the client terminals 72-1 through 72-n. The network processing part 92 operates similarly to the network processing part 92 of the client terminal 72-i.

In this embodiment, the functions of the client-server system 71 are distributed between the client terminal 72-i and the server 73. The client terminal 72-i includes the functions of converting an input character string into a logic code, and displaying the character string depending on the data received from the server 73. On the other hand, the server 73 includes the functions of creating a character pattern depending on the logic code received from the client terminal 72-i, and returning the character pattern to the client terminal 72-i.

Figure 20:
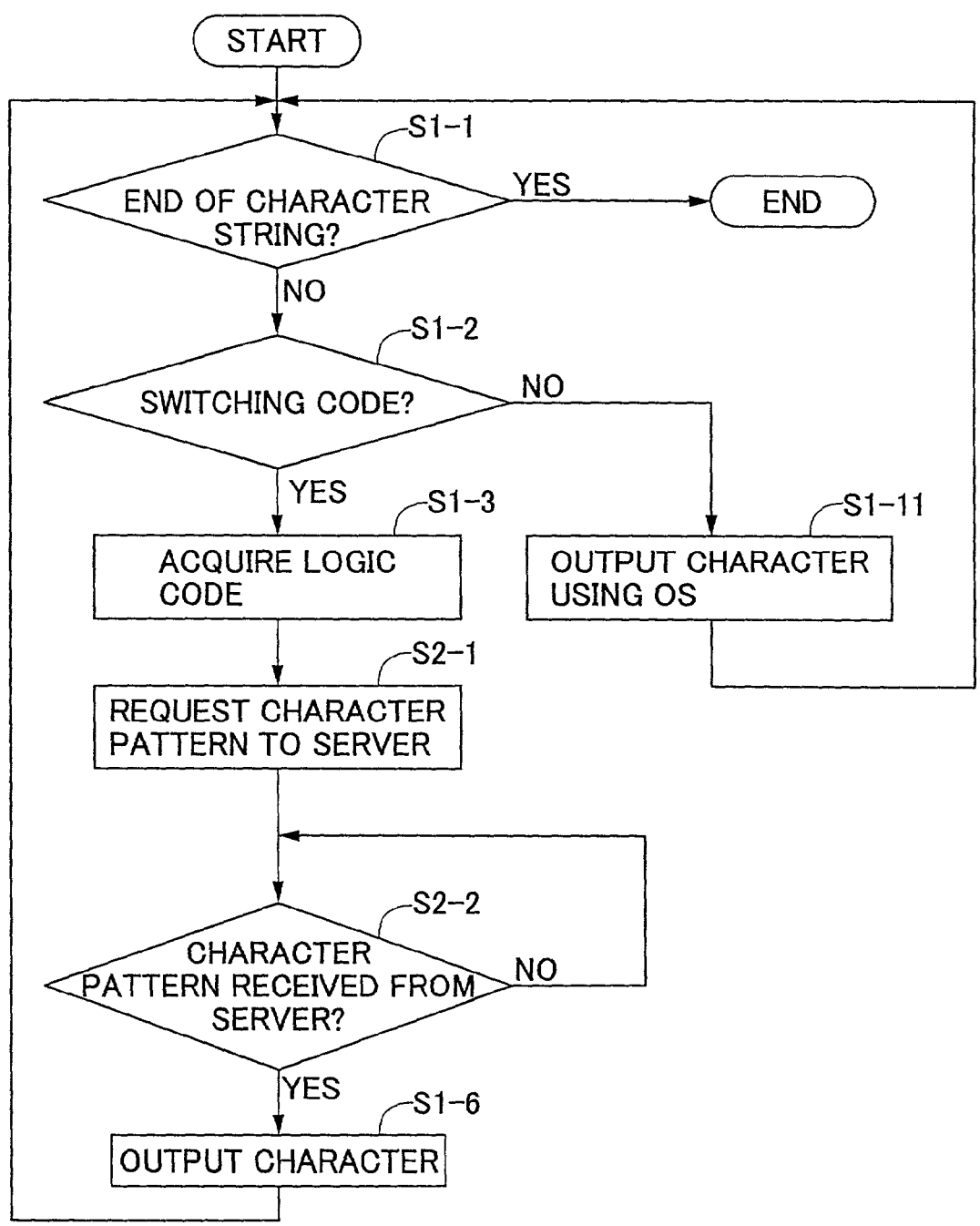
FIG. 20 is a flow chart for explaining the operation of a client terminal of the third embodiment.

A description will now be given of the operation of the client terminal 72-i, by referring to FIG. 20. FIG. 20 is a flow chart for explaining the operation of the client terminal 72-i of the third embodiment. In FIG. 20, those steps which are the same as those corresponding steps in FIG. 11 are designated by the same reference numerals, and a description thereof will be omitted.

The client terminal 72-i carries out a step S2-1 when the logic code is acquired by the step S1-3. The step S2-1 transfers the logic code acquired by the step S1-3 to the server 73. In addition, a step S2-2 decides whether or not a character pattern is received from the server 73.

If the decision result in the step S2-2 becomes YES, the step S1-6 displays and/or prints the received character pattern. Since the normal text data are in conformance with a code system of the operating system used by the client terminal 72-i, a step S1-11 outputs the standard character which is provided in the operating system. The process returns to the step S1-1 after the step S1-6 or the step S1-11.

Figure 21:
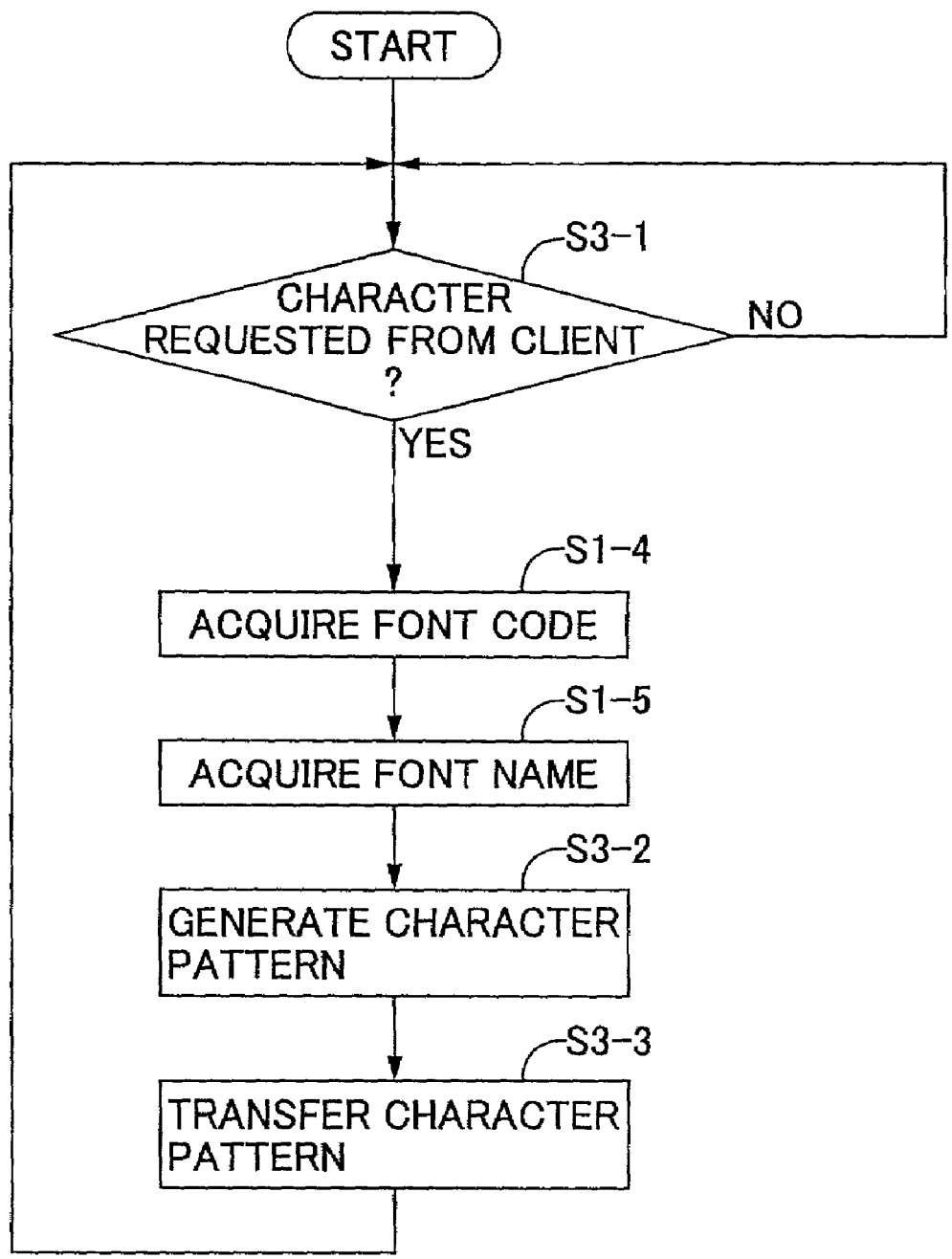
FIG. 21 is a flow chart for explaining the operation of the server of the third embodiment.

Next, a description will be given of the operation of the server 73, by referring to FIG. 21. FIG. 21 is a flow chart for explaining the operation of the server 73 of the third embodiment. In FIG. 21, those steps which are the same as those corresponding steps in FIG. 11 are designated by the same reference numerals, and a description thereof will be omitted.

The server 73 carries out a step S3-1 which decides whether or not a character pattern generating request is received from the client terminal 72-i. If the decision result in the step S3-1 is YES, the steps S1-4 and S1-5 acquire the data necessary for generating the character which is requested from the client terminal 72-i. Then, the server 73 carries out a step S3-2 which generates the character pattern based on the data acquired by the steps S1-4 and S1-5. When the character pattern is generated by the step S3-2, a step S3-3 transfers the generated character pattern to the client terminal 72-i.

Therefore, the client terminal 72-i can output the character even if the client terminal 72-i does not have the necessary font data. As a result, it is possible to effectively reduce the required storage capacity of the client terminal 72-i.

Figure 22:
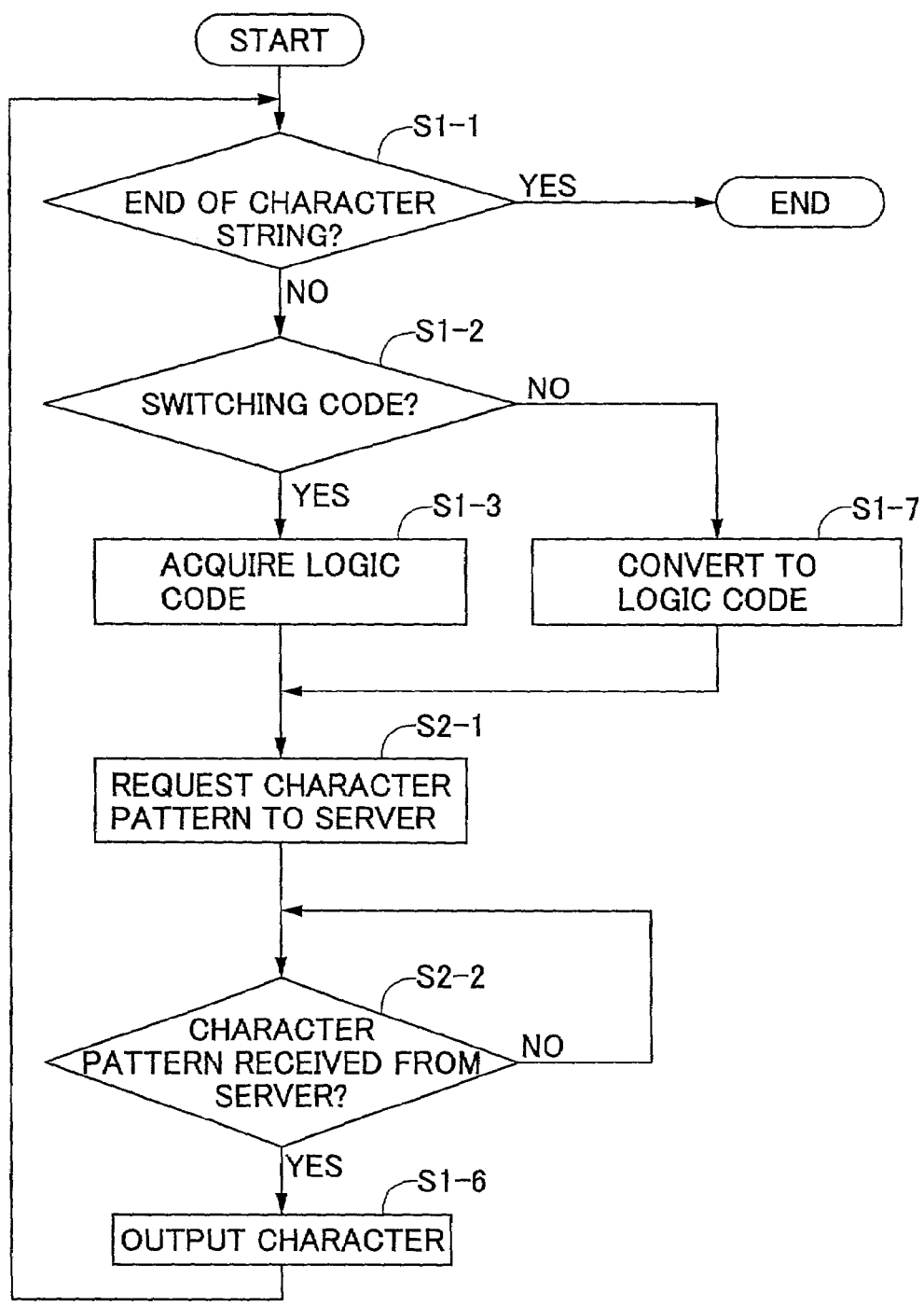
FIG. 22 is a flow chart for explaining the operation of the client terminal of a modification of the third embodiment.

In this third embodiment, basic character patterns are obtained within the client terminal 72-i. However, it is of course possible to obtain all character patterns from the server 73. Next, a description will be given of a modification of the third embodiment, which obtains all character patterns from the server 73, by referring to FIG. 22. FIG. 22 is a flow chart for explaining the operation of the client terminal 72-i of this modification of the third embodiment. In FIG. 22, those steps which are the same as those corresponding steps in FIG. 20 are designated by the same reference numerals, and a description thereof will be omitted. In this modification, it is assumed for the sake of convenience that a font number "00" indicates a standard font.

In this modification, the client terminal 72-i transfers the logic code acquired by the step S1-3 or S1-7 to the server 73, by the step S2-1 shown in FIG. 22. The server 73 which receives the logic code from the client terminal 72-i returns the corresponding character pattern to the client terminal 72-i. Hence, the client 72-i displays and/or outputs the character depending on the character pattern received from the server 73.

According to this modification, it is not necessary to generate the character patterns in the client terminal 72-i, thereby making it possible to simplify the structure of the client terminal 72-i.

Of course, the distribution of the data between the server and the client terminals is not limited to those of the embodiments and modification described above.

Therefore, according to the present invention, it is possible to process characters exceeding 1880 characters which can be registered as the external characters according to the Shift-JIS code, for example, by using the logic code, the logic code representation format (text added with the logic code), the various conversion tables and the font data described above. Furthermore, when the plane switching code is used, it is possible to register approximately 480000 characters ($\approx 256 \times 1880$) as the external characters according to the Shift-JIS code, for example.

Further, the present invention is not limited to these embodiments, but various variations and modifications may be made without departing from the scope of the present invention.

What is claimed is:

1. A character information processing apparatus that outputs a character pattern corresponding to an input data, comprising:
    a logic code acquiring unit that acquires a logic code based on the input data upon a detection of a switching code;
    a font controlling unit that acquires from the logic code acquired by said logic code acquiring unit a font number and a character code,
    wherein the acquiring of the logic code from the switching code is by using at least one table having codes corresponding to the input data, and wherein the detection of the switching code indicates an external character code corresponding to part of the input data or a character that is set with a predetermined group number, wherein the group number is a sequence of digits of the logic code; and
    an output unit that outputs the character pattern depending on the acquired character code, wherein the character pattern is generated by use of a font file corresponding to the acquired font number.

2. The character information processing apparatus according to claim 1, wherein the logic code acquiring unit acquires a first logic code based on the input data upon the detection of a switching code; the apparatus further comprising:
    a code converting unit that converts a character code having no detected switching code into a second logic code,
    wherein the font controlling unit acquires the font number and the character code from the first logic code or the second logic code.

3. The character information processing apparatus according to claim 1, wherein the font code indicates a storage location of the character pattern to be output, and the font number specifies a font name.

4. A character information processing apparatus that outputs a character pattern corresponding to an input data, comprising:
    a receiving unit that receives a logic code corresponding to the input data from a transfer source;
    a font controlling unit that acquires from the logic code acquired by said logic code acquiring unit a font number and a character code,
    wherein the acquiring of the logic code from a switching code is by using at least one table having codes corresponding to the input data, and wherein the detection of the switching code indicates an external character code corresponding to part of the input data or a character that is set with a predetermined group number, wherein the group number is a sequence of digits of the logic code;
    a character pattern generating unit that generates the character pattern, depending on the character code, using a font file corresponding to the acquired font number; and
    a transfer unit that transfers the character pattern generated by said character pattern generating unit to a transfer source.

5. A client-server system comprising:
    at least one client terminal; and
    a server that is coupled to said at least one client terminal, wherein said at least one client terminal comprises:
    an acquiring unit that acquires a logic code from an input data,
    a first transfer unit that transfers the logic code to said server, and
    an output unit that outputs a character pattern that is received from said server in response to the logic code transferred to said server,
    said server comprising a font controlling unit that acquires from the logic code acquired by said logic code acquiring unit a font number and a character code, wherein the acquiring of the logic code from a switching code is by using at least one table having codes corresponding to the input data, and wherein the detection of the switching code indicates an external character code corresponding to part of the input data or a character that is set with a predetermined group number, wherein the group number is a sequence of digits of the logic code.

6. The client-server system as claimed in claim 5, wherein said at least one client terminal further includes a code detecting unit which detects a predetermined input data, and said first transfer unit transfers the logic code which is acquired by said acquiring unit when the predetermined input data is detected by said code detecting unit.

7. A character information processing method that outputs a character pattern corresponding to an input data, comprising:
   acquiring a logic code based on the input data upon a detection of a switching code;
   acquiring from the acquired logic code a font number and a character code,
   wherein the acquiring of the logic code from the switching codeT is by using at least one table having codes corresponding to the input data, and wherein the detection of the switching code indicates an external character code corresponding to part of the input data or a character that is set with a predetermined group number, wherein the group number is a sequence of digits of the logic code; and
   outputting the character pattern depending on the acquired character code, wherein the character pattern is generated by use of a font file corresponding to the acquired font number.

8. The character information processing method according to claim 7, wherein the acquiring a logic code acquires a first logic code based on the input data upon the detection of a switching code, the method further comprising:
   converting a character code having no detected switching code into a second logic code,
   wherein the acquiring the font number and the character code is from the first logic code or the second logic code.

9. The character information processing apparatus according to claim 8, wherein the detection of switching code comprises extracting one character from a character string and using a switching table to determine whether a code to a sequence of the switching table exists.

10. A character information processing method that transfers a character pattern corresponding to an input data, comprising:
    receiving a logic code corresponding to the input data from a transfer source;
    acquiring from the acquired logic code a font number and a character code,
    wherein the acquiring of the logic code from a switching code is by using at least one table having codes corresponding to the input data, and wherein the detection of the switching code indicates an external character code corresponding to part of the input data or a character that is set with a predetermined group number, wherein the group number is a sequence of digits of the logic code;
    generating the character pattern depending on the character code, using a font file corresponding to the acquired font number; and
    transferring the character pattern generated by said generating of the character pattern to a transfer source.

11. A character information processing method adapted to a client-server system having at least one client terminal and a server that is coupled to said at least one client terminal, comprising:
    acquiring a logic code from an input data upon a detection of a switching code;
    transferring the logic code to said server;
    outputting a character pattern that is received from said server in response to the logic code transferred to said server, in said at least one client terminal; and
    acquiring from the acquired logic code a font number and a character code,
    wherein the acquiring of the logic code from the switching code is by using at least one table having codes corresponding to the input data, and wherein the detection of the switching code indicates an external character code corresponding to part of the input data or a character that is set with a predetermined group number, wherein the group number is a sequence of digits of the logic code.

12. The character information processing method as claimed in claim 11, further comprising:
    detecting a predetermined input data in said at least one client terminal, and wherein said acquiring transfers the acquired logic code to said server when the predetermined input data is detected.

13. A computer-readable storage medium storing computer-executable instructions, said computer-executable instructions controlling a computer to output a character pattern corresponding to an input data, by:
    acquiring a logic code based on the input data upon a detection of a switching code;
    acquiring from the acquired logic code a font number and a character code, wherein the acquiring of the logic code from the switching code is by using at least one table having codes corresponding to the input data, and wherein the detection of the switching code indicates an external character code corresponding to part of the input data or a character that is set with a predetermined group number, wherein the group number is a sequence of digits of the logic code; and
    outputting the character pattern depending on the acquired character code, wherein the character pattern is generated by use of a font file corresponding to the acquired font number.

14. A computer-readable storage medium storing computer-executable instructions, said computer-executable instructions controlling a computer to transfer a character pattern corresponding to an input data, by:
    receiving a logic code corresponding to the input data from a transfer source;
    acquiring from the acquired logic code a font number and a character code, wherein the acquiring of the logic code from the a switching code is by using at least one table having codes corresponding to the input data, and wherein the detection of the switching code indicates an external character code corresponding to part of the input data or a character that is set with a predetermined group number, wherein the group number is a sequence of digits of the logic code;
    generating the character pattern depending on the character code, using a font file corresponding to the acquired font number; and
    transferring the character pattern generated by said generating to a transfer source.

15. A character information processing apparatus that outputs a character pattern corresponding to an input data, comprising:
- a logic code acquiring unit that acquires a first logic code based on the input data upon a detection of a switching code;
- a code converting unit that converts a character code having no detected switching code into a second logic code;
- a font controlling unit that acquires from the first logic code, or the second logic code, a font code,
- wherein the acquiring of the first logic code from the switching code is by determining whether data in a table corresponds to a part of the input data and wherein the detection of the switching code indicates an external character code corresponding to a part of the input data or a character that is set with a predetermined group number or plane number, wherein the group number is a first sequence of digits of the logic code and the plane number is a second sequence of digits of the logic code; and
- an output unit that outputs the character pattern depending on the acquired character code, wherein the character pattern is generated by use of a font file corresponding to the acquired font number.

* * * * *

UNITED STATES PATENT AND TRADEMARK OFFICE
CERTIFICATE OF CORRECTION

PATENT NO. : 7,002,581 B2 Page 1 of 1
APPLICATION NO. : 09/961180
DATED : February 21, 2006
INVENTOR(S) : Kaoru Shimamura It is certified that error appears in the above-identified patent and that said Letters Patent is hereby corrected as shown below:

Column 17, Line 23, delete "codeT" and insert - - code - - therefor.

Signed and Sealed this

Eighth Day of August, 2006

JON W. DUDAS
*Director of the United States Patent and Trademark Office*